United States Patent
Ledford et al.

(10) Patent No.: US 10,538,678 B2
(45) Date of Patent: Jan. 21, 2020

(54) LOW VOC COATING REDUCERS

(71) Applicant: Packaging Service Co., Inc., Pearland, TX (US)

(72) Inventors: John S. Ledford, Pearland, TX (US); Jason Olson, Pearland, TX (US); John Kuca, Pearland, TX (US); Katia Baizan, Pearland, TX (US); Jean-Pierre Baizan, Pearland, TX (US); Lynn Place, Pearland, TX (US); Amber Livesey, Pearland, TX (US)

( * ) Notice: Subject to any disclaimer, the term of this patent is extended or adjusted under 35 U.S.C. 154(b) by 0 days.

(21) Appl. No.: 15/222,818

(22) Filed: Jul. 28, 2016

(65) Prior Publication Data

US 2017/0051161 A1 Feb. 23, 2017

Related U.S. Application Data

(63) Continuation of application No. 14/216,548, filed on Mar. 17, 2014, now Pat. No. 9,422,434.

(60) Provisional application No. 61/790,631, filed on Mar. 15, 2013.

(51) Int. Cl.
  *C09D 7/20* (2018.01)
  *C09D 5/00* (2006.01)
  *C09D 5/02* (2006.01)
  *C08K 5/101* (2006.01)
  *C08K 5/11* (2006.01)

(52) U.S. Cl.
  CPC ............... *C09D 7/20* (2018.01); *C09D 5/00* (2013.01); *C09D 5/02* (2013.01); *C09D 5/022* (2013.01); *C08K 5/101* (2013.01); *C08K 5/11* (2013.01)

(58) Field of Classification Search
  CPC ... C09D 7/20; C09D 5/00; C09D 5/02; C09D 5/022; C08K 5/101; C08K 5/11
  See application file for complete search history.

(56) References Cited

U.S. PATENT DOCUMENTS

| | | | | |
|---|---|---|---|---|
| 6,048,471 A | * | 4/2000 | Henry | C08G 18/0852 106/236 |
| 9,422,434 B2 | * | 8/2016 | Ledford | C09D 7/001 |
| 2005/0023503 A1 | * | 2/2005 | Pearce | C09K 5/10 252/71 |
| 2005/0202982 A1 | * | 9/2005 | Perlman | A61K 8/4973 510/118 |
| 2008/0139431 A1 | * | 6/2008 | Schreiber | C11D 7/5004 510/107 |
| 2012/0175562 A1 | * | 7/2012 | Howard | C09D 7/001 252/364 |
| 2014/0255326 A1 | * | 9/2014 | Pasin | C09D 7/001 424/61 |

FOREIGN PATENT DOCUMENTS

| | | | | |
|---|---|---|---|---|
| CA | 2244315 A1 | * | 1/2000 | B29C 73/163 |
| WO | WO-9119831 A1 | * | 12/1991 | C11D 3/18 |

OTHER PUBLICATIONS

"Attachment E: LVP-VOCS to be individually reported", California Air Resources Board 2003 Consumer & Commercial Products Survey, pp. V-18-V-24, (2003).*
Calumet LVP 100 Product Data Sheet, www.calumetubricants.com, (2004).*
Hexylene Glycol Material Safety Data Sheet by Spectrum Laboratory Products, pp. 1-7, (2006).*
Isopar M Fluid Material Safety Data Sheet by ExxonMobil, pp. 1-10, (2008).*
Premium Zero VOC Reducer Fast ZR0670-1 Material Data Safety Sheet, pp. 1-6 (2012).*

* cited by examiner

*Primary Examiner* — Anthony J Green
(74) *Attorney, Agent, or Firm* — Robert W. Strozier

(57) ABSTRACT

A coating reducers containing low volatile organic compounds (VOCs) to improve adverse environmental impacts, where the reducers may be water or solvent based and include mixtures of VOC exempt solvents and/or low vapor pressure (LVP) solvents and paints, lacquers, and varnishes diluted with the reducers.

11 Claims, No Drawings

LOW VOC COATING REDUCERS

RELATED APPLICATIONS

This application is a continuation application of U.S. patent application Ser. No. 14/216,548 filed Mar. 17, 2014 (17 Mar. 2014), now U.S. Pat. No. 9,422,434 issued Aug. 23, 2016, which claims priority to and the benefit of U.S. Provisional Patent Application Ser. No. 61/790,631, filed Mar. 15, 2013 (15 Mar. 2013).

BACKGROUND OF THE INVENTION

1. Field of the Invention

Embodiments of the present invention relate to coating reducers and cleaners that contain low volatile organic compounds (VOCs) to improve adverse environmental impacts.

More particularly, embodiments of this invention relate to coating reducers that contain low volatile organic compounds (VOCs) to improve adverse environmental impacts, where the reducers may be water or solvent based and include mixtures of VOC exempt solvents and/or low vapor pressure (LVP) solvents.

2. Description of the Related Art

A number of alternatives for the replacement of traditional reducing solvents and blends exist in the marketplace, but none of them work as well as traditional paint thinner, lacquer thinner, epoxy thinner, etc. Optimized blends with lower VOCs are necessary to allow both consumers and professionals. Such alternative have been disclosed in U.S. Pat. Nos. 6,156,833, 7,785,413, 8,329,643, and 8,337,680.

Thus, there is a continued need in the art for cost competitive, highly effective, low VOC blends for use for thinning, cleaning and flushing coatings and affected coating based equipment used in the application of the coatings.

DEFINITIONS USED IN THE INVENTION

The term "LVP-VOC" means a chemical compound or a mixture of chemical compounds having the following properties: (a) a vapor pressure less than 0.1 mm Hg at 20° C., as determined by ARB Method 310; (b) each compound has at least 12 carbon atoms, if the vapor pressure and boiling point are unknown; (c) each compound has a boiling point greater than 216° C., as determined by ARB Method 310; and/or (d) a mixture boiling point above 216° C., as determined by ARB Method 310.

The term "chemical compound" means a molecule having a definite chemical formula, which may have one or more isomeric forms.

The term "mixture of chemical compounds" means a substance comprised of two or more chemical compounds.

SUMMARY OF THE INVENTION

Embodiments of solvent based reducer compositions of this invention include 93 wt. % to 96 wt. % of acetone and 7 wt. % to 4 wt. % of a mixture of dibasic esters and methyl esters. The present invention also relates to a thinned lacquer including 50 wt. % to 90 wt. % of a lacquer and 50 wt. % to 10 wt. % of a solvent based reducer composition of this invention.

Other embodiments of solvent based reducer compositions of this invention include 50 wt. % to 80 wt. % acetone, 5 wt. % to 10 wt. % of a mixture of dibasic esters and methyl esters, 10 wt. % to 15 wt. % methyl acetate, 1 wt. % to 5 wt. % of a hydrocarbon LVP, 5 wt. % to 10 wt. % PCBTF, and 0.1 wt. % to 1 wt. % a biosolvent. The present invention also relates to a thinned paints including 50 wt. % to 90 wt. % of a paint and 50 wt. % to 10 wt. % of a solvent based reducer composition of this invention.

Other embodiments of solvent based reducer compositions of this invention include: 80 wt. % to 90 wt % acetone, 0.1 wt. % to 2 wt. % of a mixture of dimethyl esters and methyl esters, 1 wt. % to 10 wt. % of an acetate or mixture of acetates, 1 wt. % to 10 wt. % of a hydrocarbon LVP or mixture of hydrocarbons LVP and 1 wt. % to 5 wt. % PCBTF. The present invention also relates to a thinned paints including 50 wt. % to 90 wt. % of a paint and 50 wt. % to 10 wt. % of a solvent based reducer composition of this invention.

Other embodiments of solvent based reducer and cleaning compositions of this invention include: 85 wt. % to 95 wt. % of a hydrocarbon LVP or mixture of hydrocarbon LVPs, 1 wt. % to 10 wt. % PCBTF and 1 wt. % to 5 wt. % of a Soy methyl ester or a mixture of methyl ester.

Other embodiments of water based reducer compositions of this invention include 50 wt. % to 70 wt. % DI water, 20 wt. to 40 wt. % of a hydrocarbon LVP or a mixture of hydrocarbon LVP, 1 wt. % to 5 wt. % PCBTF, 0.1 wt. % to 2% of a surfactant or a mixture of surfactants, 0.1 wt. % to 1 wt. % of an emulsifier or a mixture of emulsifiers, and 0.001 wt. % to 0.5 wt. % a thickening agent. The present invention also relates to a thinned oil based paints and varnishes including 50 wt. % to 90 wt. % of a paint and 50 wt. % to 10 wt. % of a water based reducer composition of this invention.

Other embodiments of an emulsified water based reducer compositions include 75 wt. to 90 wt. % water, 1 wt. % to 10 wt. % of a mixture of methyl esters, 5 wt. % to 15 wt. % PCBTF, 1 wt. to 5 wt. % of a surfactant or mixture of surfactants, 0.5 wt. % to 5 wt. % of a biosolvent of a mixture of biosolvents), and 1 wt. % to 2 wt. % of an emulsifier or mixture of emulsifiers. The present invention also relates to a thinned oil based paints and varnishes including 50 wt. % to 90 wt. % of a paint and 50 wt. % to 10 wt. % of a water based reducer composition of this invention.

Other embodiments of composition of this invention include 66 wt. % of water, 31 wt. % of an isoparaffin such as LVP 100, 0.8 wt. % of parachlorobenzotrifluoride (PCBTF) such as Oxsol® 100 (a registered trademark of IsleChem, LLC), a VOC exempt Solvent, 0.4 wt. % of soy esters, 0.5 wt. % of a nonionic surfactant such as Berol® 260 SA ((a registered trademark of AzoNobel)), 1.2 wt. % of a second nonionic surfactant such as NP4, and 0.02 wt. % of caustic soda.

DETAILED DESCRIPTION OF THE INVENTION

The inventors have found that reducers may be formulated from blends of VOC exempt solvents or low vapor pressure (LVP) solvents including a variety of compliant solvents to improve the thinning performance of the reducer with a number of different types of coating.

Embodiments of the present invention provide blends of LVP-VOC solvents having properties adequate to replace currently available solvents and solvent system used in the coatings industry. While blends of acetone and methyl acetate are well suited for thinning most oil based coatings, they typically are too fast drying for general use. Thus, embodiments of the present invention relate to blends of acetone and methyl acetate including one or a plurality of slower evaporating agents to improve overall performance of the reducers. In certain embodiments, the slower evaporating constituents include parachlorobenzotrifluoride (PCBTF), hydrocarbon LVPs, propylene carbonate, glycol ethers, diols, glycols, acetates, polyols, amines, amides, siloxanes, alkyl methyl esters, similar slower evaporating constituents, and mixtures or combinations thereof.

The exact choice of LVP solvent will depend on the solvency requirements for the particular coating in question. Hydrocarbon LVPs typically blend well with oil based coatings, but suffer from low solvency when used alone and have extremely low evaporation rate. Acetone alone has good solvency, but evaporates very quickly and is too polar to be compatible with many oil based coatings. A blend of acetone with an LVP hydrocarbon provides higher solvency early in evaporation of the solvent from the coating, while the LVP hydrocarbon slows a rate of solvent evaporation later in evaporation of the solvent system from the coating. One potential problem with this simple blend is that hydrocarbon solvents generally have low solvency that may lead to issues after all of the high solvency acetone has evaporated. A possible solution to this problem is through the incorporation of a slower evaporating solvent or a mixture of slower evaporating solvents, which act to increase the solvency of the blend as the acetone evaporates. Such slower evaporating solvents include PCBTF, Soy methyl esters, surfactants, heavy aromatics, glycols, other suitable LVPs and/or exempt VOCs, and mixtures or combinations thereof. Small amounts of surfactants, non exempt solvents, fragrances, hydrocarbons, etc. may also be added to improve capability of the mixture with the coating composition. For example, a blend having a high percentage of acetone and smaller percentages of methyl acetate, PCBTF, Soy methyl esters, dibasic esters, surfactants, hydrocarbon LVPs, hydrocarbons, glycol ethers, polyols, ethyl lactate, d-limonene, triethanolamine, propylene carbonate and other ingredients have been shown to be advantageous in reducing typical coating compositions.

Embodiments of the reducer compositions of this invention relate to acetone based, acetone and methyl acetate based or methyl acetate based composition including one compound or a plurality of compounds selected from the group consisting of VOC exempt compounds, LVPs and small amounts of nonexempt VOCs as needed. The goal is to produce a reducer that can replace traditional solvents and solvent systems for use with oil based coatings with very low levels of nonexempt VOCs to meet regulations such as those outlined by South Coast Air Quality District (SCAQD), California Air Regulatory Board (CARB), Ozone Transportation Commission (OTC), and the Environmental Regulatory Agency (EPA).

Certain embodiments of this present invention include a water based reducer including blends of exempt VOCs, exempt VOC and LVPs, combinations of LVPs or combination thereof and a small amount of nonexempt VOCs as needed. The compounds listed herein comprise members of these classes of exempt VOCs, exempt VOC and LVPs and other exempt compounds. A typical example includes a water base including smaller percentages of PCBTF, dibasic ester, methyl esters, hydrocarbon LVPs, surfactants, emulsifying agents, methyl cellulose, ethyl lactate, d-limonene, tall oil fatty acids (or their salts), linseed oil, propylene carbonate, fragrances, triethanol amine, etc.

Such mixtures may easily be blended to form emulsions by those skilled in the art. Emulsions as well as microemulsions of these blends are included in this technology. An emulsified blend of these constituents has the advantages of reducing odors associated with some of the constituents, such as PCBTF. In addition, the emulsions have the advantage of reducing cost and total VOC content due to the water. The use and development of emulsions is well described in many publications; however, the use of blends of VOC exempt solvents, combinations of VOC exempt solvents and LVP and combinations of LVPs in such applications has not been widely addressed in the prior art. Rauls et al in U.S. Pat. No. 6,156,833 describe water based blends of water from 68-92% with methyl soy esters from 15-20%, along with small amounts of other additive (surfactants, emulsifying agents, 2-amino-2 methyl-1 propanol, acrylic acid thickeners, fluorosurfactant, polystyrene blended with soy methyl esters, drying agents, anti-skin agents, a blend of polyethylene and paraffin wax, dimethyl polysiloxane, tall oil fatty acids, acrylic emulsion, waterbased Raw Umber dispersion and tinting agents. Bortz et al in U.S. Pat. No. 7,785,413 disclose water based emulsions based mainly on Soy methyl esters and dibasic esters along with exempt VOC solvents. However, neither patent exploits the use of LVP solvents and mixtures thereof as set forth herein. In fact, most of the solvent systems are currently too expensive to be practical as a major components of the reducer composition, such as purified soy methyl ester based solvent systems. Moreover, solvent system having high levels of Soy methyl esters will also certainly increase the curing time of most coatings if used to exclusively reduce the coating. The Soy methyl esters also degrade over time, if not preserved properly. The present inventions allows for formulations of relatively inexpensive, effective reducer composition that have only low levels of nonexempt VOCs, where reducer compositions include a variety of VOC exempt solvents, combinations of VOC exempt solvents and LVPs and blends of LVP solvents.

Embodiments of the reducer composition of the present invention provide a means to thin either oil based or water based coatings as well as potentially improving the overall qualities of coating compositions to better suit that of the user. Most of water based reducers of this invention are designed to decrease the viscosity of the coating, adjust drying times, improve wet edge, increase brush stroke, improve coverage, improve the resistance to dirt, reduce the growth of mold, increase leveling, decrease hazing, decrease orange peel, etc. Typical additives used in such water based reducers include, without limitation, fluoropolymers, silver complexes, rheology control agents, stand oil, linseed oil, alkyds, guar gum, Arabic gum, fatty acids, salts of fatty acids, paraffin waxes, polyolefin waxes, halogenated paraffin waxes, polystyrene, polyacrylic acids and copolymers, polyacrylates, polyacrylic esters, polyesters, glycols, silicones, polyglutamic acid, sodium methyl allyl sulfonate, erucic acid amide, capsaicin, ammonium bromide, polymeric amino phosphate (flame retardants), Oxylink™ (a trade name of Buhler, Inc), silanes, silicones, organic metal agents for crosslinking, corrosion inhibitors (for example, sol-gels), polymeric spherical particles (oxidized, EverGlide UV 691 from and a trade name of Shamrock Technologies), polyethylene/silica dispersion (Ultramatte UV 50-GDA, from and a trade name of Shamrock Technologies) and polyglycols.

Water Based Compositions

Certain embodiments of water base paint reducers of this invention include:
- 50 wt. % to 95 wt. % water,
- 0 wt. % to 50 wt. % of a mixture of exempt VOCs and LVPs, and
- less than 5 wt. % of nonexempt VOCs.

Other embodiments of water base paint reducers of this invention include:
- 60 wt. % to 90 wt. % water;
- 0 wt. % to 30 wt. % dibasic esters, linseed oil and/or tall tatty acids;
- 0 wt. % to 30 wt. % Soy methyl esters, salts or partial salts of tall fatty acids, glycol ethers, or mixtures thereof;
- 0 wt. % to 80 wt. % of PCBTF or other halogenated hydrocarbon solvents, preferably 0 wt % to 60 wt. % of PCBTF, methylene chloride, perchlorethylene or other exempt halogenated hydrocarbon solvent;
- 0 wt. % to 60 wt. % of at least one aliphatic LVPs selected from the group consisting of SHELLSOL™ D80 (SHELLSOL™ is a trade name of Shell Chemical Co.) (SHELLSOL™ D80 is Aliphatics (Mineral Spirits) Shell Chemicals Data Sheet), ISOPAR™ M (ISOPAR™ is a trade name of ExxonMobil Chemical Co.) (ISOPAR™ M Fluid is produced from petroleum-based raw materials which are treated with hydrogen in the presence of a catalyst to produce a low odor, low aromatic hydrocarbon solvent. The major components include normal paraffins, isoparaffins, and cycloparaffins—Product Safety Summary 1. Chemical Identity), EXXSOL™ D95 (EXXSOL™ is a trade name of ExxonMobil Chemical Co.) (EXXSOL™ D95 Fluid is produced from petroleum-based raw materials which are treated with hydrogen in the presence of a catalyst to produce a low odor, low aromatic hydrocarbon solvent. The major components include normal paraffins, isoparaffins, and cycloparaffins—Product Safety Summary 1. Chemical Identity), Calumet LVP100 (Calumet is a trade name of Calumet Chemical Co.) (Calumet LVP100 is Petroleum Distillates—Product Data Sheet), and mixtures or combinations thereof, preferably 0 wt. % to 50 wt. % of at least one aliphatic LVP;
- 0 wt. % to 10 wt. % of at least one surfactants selected from the group consisting of Dow Chemical TERGITOL™ NP-9 (Nonylphenol Ethoxylate—Dow Technical Data Sheet), Dow Chemical ECOSURF™ EH-9 (alcohol ethoxylate—Dow Technical Data Sheet), DOWFAX™ Anionic Surfactants (tradename of Dow Chemicals, consists of a pair of sulfonate group on a diphenyl oxide backbone, the hydrophobe may be a linear or branched alkyl group comprises of from six to sixteen carbons), TERGITOL™ (all from Dow Chemical Co.), Berol® 260 (a narrow range non-ionic surfactant based on a synthetic primary alcohol with >80% linearity—AzoNobel Product Specification), Berol® 266 (a narrow range non-ionic surfactant based on a synthetic primary alcohol with >80% linearity—AzoNobel Product Specification), Berol® 840 (a low foaming narrow range non-ionic surfactant based on a synthetic alcohol—AzoNobel Product Specification), Ethylan™ 1003 (a nonionic surfactant based on a synthetic primary alcohol—AzoNobel Product Specification) and Ethylan™ 1005 (a nonionic surfactant based on a synthetic primary alcohol AzoNobel Product Specification) (Berol® is registered trademark and Ethylan™ is a trade name of AzoNobel), other nonylphenol (NP) free surfactants, and mixtures or combinations thereof; 0 wt. % to 10 wt. % of at least one emulsifying agent selected from the group consisting of deoiled phospholipid, lecithin, fatty acid esters, sulphonates, and mixtures or combinations thereof;
- 0 wt. % to 10 wt. % of at least one thickener selected from the group consisting of cellulose ethers, METHOCEL™ 311 (a trade name of Dow Chemicals), Klucel™ H IND (hydroxylpropylcellulose, CS grade, Klucel™ is a trade name of Ashland), MECELLOSE® (cellulose ethers, MECELLOSE® is a registered trademark of Samsung Fine Chemicals), bentonite, clays, and mixtures or combinations thereof;
- 0 wt. % to 10 wt. % of a performance additive selected from the group consisting of fragrances, polymers and copolymers (particularly of vinyl aceate, acrylic acid, acrylates, etc.), fluorosurfactants, cross linking agents, waxes, silanes, linseed oil, Soyrez 40 (a Soytek Product from and trade name of Soy Technologies, LLC), corrosion inhibitors and mixtures or combinations thereof.

The present invention provides a water based reducer composition comprising from 50 wt. % to 95 wt. % water and from 5 wt. % to 50 wt. % of a solvent system including an exempt volatile organic compounds VOCs), a low vapor pressure (LVP) hydrocarbon, nonexempt VOCs, and mixtures or combinations thereof, where the nonexempt VOCs are present in an amount less than 10 wt. % of the solvent system. In other embodiments, the composition further comprises from 50 wt. % to 70 wt. % DI water, from 20 wt. to 40 wt. % of a low vapor pressure (LVP) hydrocarbon or a mixture of LVP hydrocarbons, from 1 wt. % to 5 wt. % parachlorobenzotrifluoride, from 0.1 wt. % to 2% of a surfactant or a mixture of surfactants, from 0.1 wt. % to 1 wt. % of an emulsifier or a mixture of emulsifiers, and from 0.001 wt. % to 0.5 wt. % a thickening agent. In other embodiments, the composition further comprises from 50 wt. % to 70 wt. % DI water, from 20 wt. to 40 wt. % of a low vapor pressure (LVP) hydrocarbon or a mixture of LVP hydrocarbons, from 1 wt. % to 5 wt. % parachlorobenzotrifluoride, from 0.1 wt. % to 2% of a surfactant or a mixture of surfactants, from 0.1 wt. % to 1 wt. % of an emulsifier or a mixture of emulsifiers, and from 0.001 wt. % to 0.5 wt. % a thickening agent. In other embodiments, the composition further comprises from 0 wt. % to 30 wt. % dibasic esters, linseed oil and/or tall fatty acids, from 0 wt. % to 30 wt. % soy methyl esters, salts or partial salts of tall fatty acids or glycol ethers, from 0 wt. % to 40 wt. % of a VOC exempt cosolvent selected from the group consisting of parachlorobenzotrifluoride, chlorinated hydrocarbon, fluorinated hydrocarbon, other aromatic halogenated hydrocarbon, carbonate, acetate, from 0 wt. % to 10 wt. % of a surfactant or a mixture of surfactants, from 0 wt. % to 10 wt. % of an emulsifying agent or a mixture of emulsifying agents, from 0 wt. % to 10 wt. % of a thickener or a mixture of thickeners, from 0 wt. % to 10 wt. % of a performance additive system including exempt, partially exempt and nonexempt VOCs, and from 0 wt. % to 10 wt. % of a secondary additive system selected from the group consisting of fragrances, fluorosurfactants, cross linking agents, waxes, silanes, corrosion inhibitors, and mixtures or combinations thereof.

Emulsified Compositions

The present invention provides an emulsified water based reducer composition comprising from 75 wt. to 90 wt. % water, from 1 wt. % to 10 wt. % of a mixture of methyl esters, from 5 wt. % to 15 wt. % parachlorobenzotrifluoride, from 1 wt. to 5 wt. % of a surfactant or mixture of surfactants, from 0.5 wt. % to 5 wt. % of a biosolvent of a mixture of biosolvents, and from 1 wt. % to 2 wt. % of an emulsifier or mixture of emulsifiers.

The present reducer compositions are effective at thinning paints, varnishes, expoxies, polyurethanes and other oil based coatings. These reducer compositions are also effective at cleaning up equipment used to apply these coatings, particularly when the coating has not fully cured. The other advantage of the solvent based reducer agents of this invention is that they are compliant with many demanding government requirements for VOCs. These blends should easily meet requirements for 3% (w/w) VOCs if formulated by someone skilled in the art.

Solvent Based Compositons

Embodiments of solvent based reducer compositions of this invention include:

100 wt. % of at least one LVP;
0 wt. % to 99 wt. % of acetone;
0 wt. % to 99 wt. % methyl acetate;
0 wt. % to 99 wt. % at least one exempt VOCs; and
less than 5 wt. % of at least one VOC, where:
the LVPs are selected from the group consisting of hydrocarbon LVPs (e.g., SHELLSOL™ D80, EXXSOL™ D95, Calumet LVP 100), glycols, polyols, fatty acids and their salts, other LVPs listed herein, and mixtures or combinations thereof as well as dibasic esters, Soy methyl esters, hydrocarbons as retarding agents and to improve solvency,
the exempt VOCs are selected from the group consisting of PCBTF, propylene carbonate, butyl acetate, siloxanes, and mixtures or combinations thereof may be added to increase solvency and potentially slow the evaporation rate, of the blend,
the VOCs are selected from the group consisting of as ethyl lactate, surfactants, naphtha, triethanol amine, d-Limonene, Pinenes, fragrances, and mixtures or combinations thereof added to improve selected properties.

Other embodiments of the solvent based compositions of this invention include:

50 wt. % to 97 wt. % of a mixture of acetone, methyl acetate, t-butyl acetate, and at least one LVP solvent. Other embodiments of the solvent based compositions of this invention include 60 wt. % to 95 wt. % of a mixtures of acetone, methyl acetate and at least one LVP hydrocarbon. In these formulations the LVP hydrocarbons are selected from the group consisting of Calumet LVP 100, ISOPAR™ M, SHELLSOL™ D80, EXXSOL™ D95 and mixtures or combinations thereof.

The present invention provides a solvent based composition comprising: from 40 wt. % to 96 wt. % of a solvent system, and from 50 wt. % to 4 wt. % of an additive system to improve reducing or thinning properties of the solvent system and/or to improve cleaning properties of the solvent system. In certain embodiments, the solvent system comprises from 93 wt. % to 96 wt. % of acetone, and the additive system comprises from 7 wt. % to 4 wt. % of a mixture of dibasic esters and methyl esters. In other embodiments, the solvent system comprises from 80 wt. % to 90 wt % acetone, from 1 wt. % to 10 wt. % of a low vapor pressure (LVP) hydrocarbon or a mixture of LVP hydrocarbons, and from 1 wt. % to 5 wt. % parachlorobenzotrifluoride, and the additive system comprises from 0.1 wt. % to 2 wt. % of a mixture of dimethyl esters and methyl esters, and from 1 wt. % to 10 wt. % of an acetate or mixture of acetates. In other embodiments, the solvent system comprises from 50 wt. to 80 wt. % acetone, from 1 wt. % to 5 wt. % of a low vapor pressure (LVP) hydrocarbon or a mixture of LVP hydrocarbons, from 5 wt. % to 10 wt. % parachlorobenzotrifluoride, and from 0.1 wt. % to 1 wt. % a biosolvent, and the additive system comprises from 5 wt. % to 10 wt. % of a mixture of dibasic esters and methyl esters, and from 10 wt. % to 15 wt. % methyl acetate. In other embodiments, the solvent system comprises from 85 wt. % to 95 wt. % of a low vapor pressure (LVP) hydrocarbon or a mixture of LVP hydrocarbons, and from 1 wt. % to 10 wt. % parachlorobenzotrifluoride, and the additive system comprises from 1 wt. % to 5 wt. % of a methyl ester or a mixture of methyl esters.

The present invention provides a composition comprising from 40 wt. % to 99 wt. % acetone, methyl acetate, t-butyl acetate, low vapor pressure (LVP) hydrocarbon or a mixture of LVP hydrocarbons, or mixtures and combinations thereof, from 0 wt. % to 40 wt. % parachlorobenzotrifluoride, chlorinated hydrocarbons, fluorinated hydrocarbons, halogenated aromatic hydrocarbons, carbonates, or mixtures and combinations thereof, from 0 wt. % to 99 wt. % of dibasic esters, methyl esters, fatty acids, salts of fatty acids, glycols, glycol ethers, or mixtures and combinations thereof, from 0 wt. % to 25 wt. % of nonexempt or partially exempt volatile organic compounds selected from the group consisting of tetrahydrofurfuryl alcohol, triethanolamine, naphtha, d-limonene, and mixtures or combinations thereof, and from 0 wt. % to 5 wt. % of additives to improve the properties of the composition selected from the group consisting of thickeners, surfactants, fragrances, ethyl lactate, surfactants, solids, microsolids, and mixtures or combinations thereof.

Thinned Compositions

The present invention provides a thinned composition comprising from 50 wt. % to 90 wt. % of a paint, a varnish or a lacquer, and from 50 wt. % to 10 wt. % of a based reducer component including from 50 wt. % to 80 wt. % acetone, from 5 wt. % to 10 wt. % of a mixture of dibasic esters and methyl esters, from 10 wt. % to 15 wt. % methyl acetate, from 1 wt. % to 5 wt. % of a low vapor pressure (LVP) hydrocarbon or a mixture of LVP hydrocarbons, from 5 wt. % to 10 wt. % parachlorobenzotrifluoride, and from 0.1 wt. % to 1 wt. % a biosolvent. In other embodiments, the reducer component includes from 80 wt. % to 90 wt % acetone, from 0.1 wt. % to 2 wt. % of a mixture of dimethyl esters and methyl esters, from 1 wt. % to 10 wt. % of an acetate or mixture of acetates, from 1 wt. % to 10 wt. % of a low vapor pressure (LVP) hydrocarbon or a mixture of LVP hydrocarbons, and from 1 wt. % to 5 wt. % parachlorobenzotrifluoride. In other embodiments, the reducer component includes from 50 wt. % to 70 wt. % DI water, from 20 wt. to 40 wt. % of a low vapor pressure (LVP) hydrocarbon or a mixture of LVP hydrocarbons, from 1 wt. % to 5 wt. % parachlorobenzotrifluoride, from 0.1 wt. % to 2% of a surfactant or a mixture of surfactants, from 0.1 wt. % to 1 wt. % of an emulsifier or a mixture of emulsifiers, and from 0.001 wt. % to 0.5 wt. % a thickening agent. In other embodiments, the reducer component includes from 75 wt. to 90 wt. % water, from 1 wt. % to 10 wt. % of a methyl ester or a mixture of methyl esters, from 5 wt. % to 15 wt. % parachlorobenzotrifluoride, from 1 wt. to 5 wt. % of a surfactant or mixture of surfactants, from 0.5 wt. % to 5 wt. % of a biosolvent or a mixture of biosolvents, and from 1 wt. % to 2 wt. % of an emulsifier or a mixture of emulsifiers. In other embodiments, the reducer component includes from 93 wt. % to 96 wt. % of acetone, and from 7 wt. % to 4 wt. % of a mixture of dibasic esters and methyl esters.

These formulations may also include from 0 wt. % to 40 wt. % of VOC exempt cosolvent selected from the groups consisting of PCBTF, chlorinated hydrocarbon, fluorinated hydrocarbon, other aromatic halogenated hydrocarbon, carbonate, acetate, and mixtures or combinations thereof. Other embodiments of these formulations may include from 0 wt. % to 35 wt. % of VOC exempt cosolvent selected from the groups consisting of PCBTF, propylene carbonate, t-butyl acetate, perchlorethylene, methylene chloride and mixtures or combination thereof.

These formulations may also include 0 wt. % to 30 wt % of a second LVP co-solvent selected from the group consisting of dibasic esters, methyl esters, fatty acids, salts of fatty acids, glycols, hydrocarbons or glycol ethers (inclusive of those mentioned above, mostly LVP products) or combinations thereof. Other embodiments of these formulations may include 0 wt. % to 20 wt. % a second LVP co-solvent selected from the group consisting of dibasic esters, Soy methyl esters, tall oil fatty acids, salts of tall oil fatty acids, glycols, hydrocarbons or glycol ethers (inclusive of those mentioned above, mostly LVP products) or combinations thereof.

These formulations may also include 0 wt. % to 25 wt. % of nonexempt or partially exempt VOCs selected from the group consisting of hydrocarbon solvents, tetrahydrofurfuryl alchohol, triethanolamine, naphtha, d-limonene, thickeners, fragrances, ethyl lactate, glycols, glycol ethers, surfactants and combinations thereof. Most preferably, 0-15% of lighter hydrocarbon LVP, such as SHELLSOL™ D80, mineral spirits, ethyl lactate, thickeners, surfactants (nonionic) and mixtures or combinations thereof.

These formulations may also include 0 wt. % to 5 wt. % of additives to improve the properties of the reduced coating, such as thickeners, surfactants, and other additives, many of these type of additives are listed above can be used alone or in combination and are well known to those skilled in the art. These formulations may also include from 0 wt. % to 5 wt. % of additives to improve the properties of the composition selected from the group consisting of thickeners, surfactants, fragrances, ethyl lactate, surfactants, solids, microsolids, and mixtures or combinations thereof.

These compositions are effective in reducers for oil and water based paints. They are particularly effective at reducing or diluting water based paints. In some cases, they can improve properties of the paint, such as wet edge, dry time, brush stroke length, stain resistance, mildew resistance, coating hardness, coating adhesion and more. These blends can also be easily adjusted by someone skilled in the art to meet the new VOC limits imposed by many government agencies. The renewable content could also be increased, if necessary.

Suitable Reagents for Use in the Invention

Suitable LVP-VOC solvents useful in the compositions of this invention include, without limitation, acetone, methyl acetate, parachlorobenzotrifluoride (PCBTF), benzotrifluoride (BTF), perchloroethylene (PERC), cyclic, branched, or linear completely methylated siloxanes, propylene carbonate, dimethyl carbonate, tertiary butyl acetate (TBAc), halogenated compounds, other solvents outlined in the List of Exempt Compounds in 40 CFR 51.100 (s), and mixtures or combinations thereof. In addition, a number of LVP products are exempted by a number of requirements outlined in CARB (California Air Regulatory Board, Regulations for Reducing Emissions of Consumer Products 94508 (a) (94) generically by several definitions). Such solvents or compounds include solvents or compounds having vapor pressures less than 0.10 mm Hg. Generally, these compounds evaporate very slowly and have very low rates of evaporation. Manufacturers have been qualifying a number of solvents or compounds as LVP certified, based on CARB requirements.

Typical examples of VOC exempt solvents and LVP solvents each have limitations alone. Therefore, we have undertaken to develop advantageous blends of VOC exempt solvents, combination of VOC exempt solvents and LVPs and blends of LVPs. CARB has issued a list of accepted LVP solvents in 2003 (attachment E, CARB LVP-VOCs to be Individually Reported from their 2003 Consumer & Commercial Products Survey . . . ), which is incorporated by reference. A number of these compounds have specific advantages to those skilled in the art of reducing coatings. Some examples, include, diols, esters, glycol ethers, glycols, amines, hydrocarbons, amines, phthalates, etc. Some of the most advantageous blends are those of VOC exempt solvents and LVPs together. Acetone is one of the least expensive exempt VOC solvents, with high solvent strength. However, acetone alone is too fast for most reducing applications due to its high rate of evaporation. A combination of Acetone and Soy Methyl Esters has been shown to be advantageous for thinning Lacquers (Bortz U.S. Pat. No. 7,785,413). The Soy Methyl Esters have been listed as an LVP solvent, but they are expensive and are prone to degrade over time if not preserved properly. In addition, we have found that this blend is not as advantageous for reducing other coatings, such as paints, varnishes, epoxies, etc. Most standard paint thinners, varnish thinners, epoxy thinners and even lacquer thinners are complex blends of solvents. Some of the solvents are used to increase solvent strength (measured in some cases by Kb value or estimates thereof) and other solvents are included in blends to mitigate the rate of evaporation of the mixture. Standard paint thinner is typically a complex blend of various aliphatic and aromatic hydrocarbons. Duplicating the performance of such a complex blend can be challenging. We have discovered that that it can be advantageous to employ a number of Low VOC solvents or blends of LVP solvent, VOC solvents blends and mixtures thereof to achieve similar performance to the standard reducing agents currently on the market.

Acetone and water are the obvious, low cost options for reducing blends. However, both water and acetone tend to evaporate too quickly alone. Worse, they are both poor solvents for many oil based coatings. Even water based coatings suffer some loss in performance, when diluted or reduced solely with water. On the other hand, US Patent Application 2007/0101902 A1 teaches that a blend of only methyl soy esters and dibasic esters may be suitable for this application. These blends do have low odor and have high renewable content, but evaporate so slowly that they can significantly increase the drying time of a coating as well as being expensive. Less expensive hydrocarbon LVP products obtained from nonrenewable sources also extend the drying times of paints and lack the solvency to effectively reduce or dilute many coatings. Simply put, there is a need to develop new blends that mimic the properties of standard solvents, such as methylethylketone (MEK), xylenes, mineral spirits, turpentine, toluene, glycol ethers, alcohols, etc. and mixtures of such solvents.

Exemplary slower evaporating compounds include, without limitation, (a) diols such as 1,3-butanediol, 1,4-butanediol, 1,5-pentanediol, 1,6-hexanediol, higher alkanediols, and mixtures or combinations thereof; (b) diol derivatives such as 2-butoxy-1-pentanediol, 2,2,4-trimethyl-1,3-pentanediol isobutyrate, other diol derivatives, and mixtures or combinations thereof; (c) ketones such as 2-pyrrolidone, N-methyl-2-pyrrolidone, other heterocyclic ketones, and mixtures or combinations thereof; (d) methyl esters such as methyl esters of $C_{12}$-$C_{36}$ carboxylic acids including methyl laurate (methyl dodecanate), methyl tridecylicate (methyl tridecanate), methyl myristic (methyl tetradecanate), methyl pentadecylic (methyl pentadecanate), methyl palmitic (methyl hexadecanate), methyl margaric (methyl heptadecanate), methyl stearic (methyl octadecanate), methyl nonadecylic (methyl nonadecanate), methyl arachidic (methyl eicosanate), methyl heneicosylic (methyl heneicosanate), methyl behenic (methyl docosanate), methyl tricosylic (methyl tricosanate), methyl lignoceric (methyl tetracosanate), methyl pentacosylic (methyl pentacosanate), methyl cerotic (methyl hexacosanate), methyl heptacosylic (methyl heptacosanate), methyl montanic (methyl octacosanate), methyl nonacosylic (methyl nonacosanate), methyl melissic (methyl triacontanate), methyl henatriacontylic (methyl henatriacontanate), methyl laccerate (methyl dotriacontanate), methyl psyllic (methyl tritriacontanate), methyl geddic (methyl tetratriacontanate), methyl ceroplastic (methyl pentatriacontanate), methyl hexatriacontylate (methyl hexatriacontanate), methyl α-linolenate, methyl stearidonate, methyleicosapentaenate, methyl docosahexaenate, methyl linoleate, methyl linolenate, methyl dihomo-γ-linolenate, methyl arachidonate, methyl adrenate, methyl palmitoleate, methyl vaccenate, methyl paullinate, methyl oleiate, methyl elaidate, methyl gondate, methyl erucate, methyl nervonate, methyl meadate, other similar methyl esters, and mixtures or combinations thereof, (e) alcohols such as benzyl alcohol; (f) dibasic esters such as dimethyl succinate, diethyl succinate, dipropyl succinate, diisopropyl succinate, dibutyl succinate, dimethyl glutarate, diethyl glutarate, dipropyl glutarate, diisopropyl glutarate, dibutyl glutarate, dimethyl adipate, diethyl adipate, dipropyl adipate, diisopropyl adipate, dibutyl adipate, dimethyl phthalate, diethyl phthalate, dipropyl phthalate, diisopropyl phthalate, dibutyl phthalate, higher dibasic esters, and mixtures or combinations thereof; (g) hydrocarbon solvents such as, but are not limited to, EXXSOL™ D95, EXXSOL™ D110, ISOPAR™ M, ISOPAR™ V (from and trademarks or trade names of ExxonMobil) LINPAR® 1416-V Paraffin, LPA® 170 Solvent (from and trademarks or trade names of Sasol), Calumet LVP 100, Calumet LVP 200 (from and trade names of Calumet), CONOSOL® 215, DRAKESOL® 205, DRAKESOL® 220 (from and trademark of Calumet), SOLTROL® 170, and SOLTROL® 220 (Chevron Phillips), isohexadecane, 1-tetradecene, other hydrocarbon solvents, and mixtures or combinations thereof; (h) N,N-Diethyl-meta-toluamide (DEET); (i) acetates such as diethylene glycol ethyl ether acetate, dipropylene glycol methyl ether acetate, dipropylene glycol ethyl ether acetate, oxo-decyl acetate, oxo-dodecyl acetate, other ether acetates, and mixtures or combinations thereof; (j) anhydrides such as phthalic anhydride, other anhydrides, and mixtures or combinations thereof; (k) glycols such as ethylene glycol, diethylene glycol, triethylene glycol, propylene glycol, dipropylene glycol, higher glycols, and mixtures or combinations thereof; (l) ether such as ethylene glycol ester, ethylene glycol monohexyl ether, ethylene glycol monophenyl ether, diethylene glycol monoethyl ether, diethylene glycol monopropyl ether, diethylene glycol monobutyl ether, diethylene glycol mono(2-ethylhexyl) ether, triethylene glycol monomethyl ether, triethylene glycol monoethyl ether, triethylene glycol monopropyl ether, triethylene glycol monobutyl ether, triethylene glycol mono(2-ethylhexyl) ether, propylene glycol phenyl ether, tripropylene glycol n-propyl ether, dipropylene glycol n-butyl ether, dipropylene glycol phenyl ether, tripropylene glycol methyl ether, tripropylene glycol n-butyl ether, higher glycol ethers, and mixtures or combinations thereof; (m) alkanol amines such as monoethanolamine, diethanolamine, triethanolamine, monoisopropanolamine, diisopropanolamine, triisopropanolamine, higher monoalkanol amines, dialkanol amines and trialkanol amines, and mixtures or combinations thereof; and (n) mixtures or combinations thereof.

EXPERIMENTS OF THE INVENTION

Example 1

A mixture of 91 wt. % acetone, 4 wt. % dibasic esters (e.g., SANTOSOL® DME-1, a registered trademark of Cytec Industries Inc.) and 5 wt. % Soy methyl esters (Cargill Methyl Soyate or equivalent) were mixed together to generate a product useful for thinning lacquers. The product thinned lacquer Dunn Edwards 275 Lacquer effectively at up to 30% dilution (Dunn Edwards Paints). The product was also effective at thinning and spraying Sherwin-Williams® Fast Dry Sand and Seal at up to 30% dilution (Sherwin-Williams® is a registered trademark of Sherwin-Williams Company).

Example 2

A blend of 82 wt. % acetone, 3 wt. % Dibasic Esters (SANTOSOL® DME-1), 3 wt. % Soy methyl esters, 9 wt. % methyl acetate and 3 wt. % PCBTF. The product was found to be an effective thinning agent for a wide array of paints, including, but not limited to Sherwin-Williams® Alkyd ProMar 200 (oil based), Dunn Edwards (Oil Based), RUST-OLEUM® Enamel (Oil Based); Dunn Edwards 275 Lacquer, CABOT® Spar Varnish or similar products at up to 30% dilution rate. The product displayed very good thinning properties (similar to the control Crown Paint Thinner) and excellent finish qualities in spray and brush testing.

Example 3

A blend of 77 wt. % acetone; 4 wt. % dimethyl esters of diacids (SANTOSOL® DME-1, 60 wt. % to 70 wt. % dimethyl glutarate, 10 wt. % to 25 wt. % dimethyl succinate, and 5 wt. % to 15 wt. % dimethyl adipate), 4 wt. % Soy Methyl Esters (Soytek™ 1000E from and trade name of Soy Technologies, LLC), 5 wt. % methyl acetate and 10 wt. % PCBTF was prepared by add the products in the order listed. The resulting blend was found to be an effective thinning agent for a wide array of paints, including, but not limited to Sherwin-Williams® Alkyd ProMar 200 (oil based), Dunn Edwards Paint (Oil Based), RUST-OLEUM® Enamel (Oil Based); CABOT® Spar Varnish and other at up to 30% dilution rate. The product displayed very good thinning properties (similar to the control Crown® Paint Thinner—a registered trademark of Packaging Service Co., Inc. of Pearland, Tex.) and excellent finish qualities in spray and brush testing). Testing of cleaning of paint spots and painted wood surfaces with the Sherwin-Williams® Alkyd ProMar 200 paint showed that it cleaned as well as Standard Paint Thinner after 1-3 hours of dry time (about half required to completely dry the paint per the directions on the label). The cleaning was performed with a dampened cloth rag (supplied by Sherwin-Williams® Paint Stores). The paint was applied using a synthetic brush on pine plywood (cleaned furniture grade).

Example 4

A solvent based reducer was prepared from 85 wt. % hydrocarbon LVP (EXXSOL™ D-95), 8 wt. % PCBTF and 3 wt. % Soy methyl esters blend (Soy Methyl Esters) and 4 wt. % dimethyl esters of diacids (SANTOSOL® DME-1). This blend was shown to perform very well at flushing both air and airless spray guns. The product was roughly 50% more effective (based on volume of product required to generate a clear liquid), compared to other LVP Odorless Mineral Spirits (from Klean-Strip® and Sunnyside Corporation) or LVP hydrocarbon solvents alone. The product was also more effective in cleaning freshly painted wood surfaces as described in Example 3.

Example 5

A solvent based thinner including a blend of 70-80 wt. % acetone; 10-15 wt. % methyl acetate, 4-7 wt. % of a mixture of PCBTF, LVP hydrocarbons and biosolvents, and 4-6 wt. % of a mixture of soy methyl esters was prepared by add the products in the order listed. A composition of this example was tested in a number of different systems and the results are given below:

| THINNER (<25) ANALYSIS | THINNER of This Example - (<25 g/L) | Crown® Low VOC LT (<25) | Crown® Paint Thinner | Crown® MEK | Crown® Toluene | Crown® VM&P Naphtha | Crown® Xylol |
|---|---|---|---|---|---|---|---|
| Performance Testing Comparisons | | | | | | | |
| Thinning oil paint (10-30%)** | Excellent | Good | Good | Excellent | Marginal | Good | Marginal |
| Thinning varnish (10-30%)*** | Excellent | Excellent | Good | Excellent | Marginal | Good | Marginal |
| Thinning lacquer (10-30%)**** | Excellent | Excellent | Excellent | Excellent | Marginal | Good | Marginal |
| Thinning enamel (10-30%)** | Good | Good | Excellent | Excellent | Marginal | Good | Marginal |
| Applying oil paint to primed surface | Excellent | Good | Excellent | Excellent | Good | Excellent | Marginal |
| Applying varnish to primed surface | Excellent | Excellent | Excellent | Excellent | Good | Excellent | Marginal |
| Applying lacquer wood surface | Good | Good | Good | Good | Marginal | Good | Marginal |
| Applying enamel to painted surface | Excellent | Good | Good | Good | Marginal | Good | Marginal |
| Spray gun usage: oil paint | Good | Good | Good | Excellent | Good | Good | Marginal |
| Spray gun usage: lacquer | Excellent | Excellent | Excellent | Excellent | Marginal | Excellent | Poor |
| General surface prep prior to paint application | Excellent | Good | Excellent | Good | Marginal | Good | Good |
| General clean-up of oil paint & varnish spills | Excellent | Excellent | Excellent | Good | Good | Good | Excellent |
| Cleaning synthetic brushes (oil paint) | Excellent | Good | Good | Good | Marginal | Good | Excellent |
| Cleaning natural brushes (oil paint) | Good | Good | Good | Good | Marginal | Good | Excellent |

The data demonstrates that this thinner is equivalent to and superior to many of the other thinners that are commercially available.

Example 6

A water based reducer was prepared from 66.5 wt. % DI water, 27 wt. % hydrocarbon LVP (EXXSOL™ D80), 5 wt. % PCBTF, 1% surfactant (DOW® NP-9 from Dow Chemical Company), 0.5 wt. % emulsifier (Berol® 260 trade name of AkzoNobel). The product was prepared by mixing all the components but water together and then water the slowly to the mixture with agitation (a magnetic stir motor is adequate). This emulsified blend was found to be stable for hours without the need of high shear agitation. The product also effectively thinned oil based paints and varnishes as above up to 30% dilution.

Example 7

An emulsified water based reducer was prepared by adding 67 wt. % water to a stirred mixture of 6 wt. % Soy methyl ester blend (Soytek™ 1000E) and 4 wt. % Soy methyl ester blend (Soytek™ 5000X-TB), 22 wt. % PCBTF, and 1 wt. % Vertec Citrus Blend (Vertec Biosolvents) (blend of citrus (orange or lemon/lime) terpenes). The product was found to effectively thin Sherwin-Williams® Promar 200 Latex Based Paint at a dilution rate of up to 30% as well as several oil based paints (including Sherwin-Williams® Pro-Mar 200). In addition, the product significantly improved wet edge, increased dry time and predictably decreased viscosity of the paint.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:
1. A solvent based reducer composition comprising:
    less than 100 wt. % and greater than 95 wt. % of at least one low vapor pressure (LVP) solvent selected from the group consisting of a normal paraffin, an isoparaffin, a cycloparaffin, and mixtures thereof; and
    greater than 0 wt. % and less than 5 wt. % of a volatile organic compound (VOC) consisting essentially of ethyl lactate, naphtha, an alkanolamine, a glycol, a polyol, or mixtures thereof, wherein the composition contains no water or aqueous components, and wherein the composition is used to reduce oil based coating compositions.

2. The solvent based reducer composition of claim 1, wherein the at least one LVP comprises: (a) a mixture of normal paraffins and isoparaffins, (b) a mixture of normal paraffins and cycloparaffins, or (c) a mixture of normal paraffins, isoparaffins, and cycloparaffins.

3. The solvent based reducer composition of claim 1, further comprising:

greater than 0 wt. % to 99 wt. % of at least one exempt VOC selected from the group consisting of parachlorobenzotrifluoride (PCBTF), propylene carbonate, butyl acetate, a siloxane, and mixtures thereof based on the wt. % of the at least one low vapor pressure (LVP) solvent and the volatile organic compound.

4. The solvent based reducer composition of claim 1, wherein the at least one VOC is selected from the group consisting of a glycol, and a polyol.

5. The solvent based reducer composition of claim 1, further comprising:

greater than 0 wt. % to 99 wt. % of methyl acetate based on the wt. % of the at least one low vapor pressure (LVP) solvent and the volatile organic compound.

6. The solvent based reducer composition of claim 1, wherein the at least one VOC is selected from the group consisting of ethyl lactate, an alkanolamine, a glycol, a polyol, or mixtures thereof.

7. The solvent based reducer composition of claim 1, wherein the at least one LVP solvent further includes dibasic esters, soy methyl esters, or mixtures thereof.

8. The solvent based reducer composition of claim 7, wherein:

the dibasic ester is selected from the group consisting of dimethyl succinate, diethyl succinate, dipropyl succinate, diisopropyl succinate, dibutyl succinate, dimethyl glutarate, diethyl glutarate, dipropyl glutarate, diisopropyl glutarate, dibutyl glutarate, dimethyl adipate, diethyl adipate, dipropyl adipate, diisopropyl adipate, dibutyl adipate, dimethyl phthalate, diethyl phthalate, dipropyl phthalate, diisopropyl phthalate, dibutyl phthalate, higher dibasic esters, and mixtures thereof.

9. A solvent based reducer composition comprising:

from 40 wt. % to 99 wt. % of a solvent system comprising methyl acetate, t-butyl acetate, a low vapor pressure (LVP) hydrocarbon or a mixture of LVP hydrocarbons, or mixtures thereof;

from 1 wt. % to 40 wt. % of secondary solvents consisting essentially of parachlorobenzotrifluoride, a chlorinated hydrocarbon, a fluorinated hydrocarbon, a halogenated aromatic hydrocarbon, or mixtures thereof, greater than 0 wt. % to 99 wt. % of a dibasic esters, a methyl ester of a $C_{12}$-$C_{36}$ carboxylic acid, a fatty acid, a salt of a fatty acid, a glycol, or mixtures thereof based on the wt. % of the solvent system and the secondary solvents;

greater than 0 wt. % to 25 wt. % of nonexempt or partially exempt volatile organic compound selected from the group consisting of tetrahydrofurfuryl alcohol, an alkanolamine, naphtha, and mixtures thereof based on the wt. % of solvent system and the secondary solvents; and greater than 0 wt. % to 5 wt. % of additives to improve the properties of the composition selected from the group consisting of a thickener, a surfactant, a fragrance, ethyl lactate, a solid, and mixtures thereof based on the wt. % of the solvent system and the secondary solvents, wherein the LVP hydrocarbon or LVP hydrocarbons are selected from the group consisting of a normal paraffin, an isoparaffin, a cycloparaffin, and mixtures thereof, and wherein the composition is used to reduce oil based coating compositions.

10. The solvent based reducer composition of claim 9, wherein:

the dibasic ester is selected from the group consisting of dimethyl succinate, diethyl succinate, dipropyl succinate, diisopropyl succinate, dibutyl succinate, dimethyl glutarate, diethyl glutarate, dipropyl glutarate, diisopropyl glutarate, dibutyl glutarate, dimethyl adipate, diethyl adipate, dipropyl adipate, diisopropyl adipate, dibutyl adipate, dimethyl phthalate, diethyl phthalate, dipropyl phthalate, diisopropyl phthalate, dibutyl phthalate, higher dibasic esters, and mixtures thereof.

11. The solvent based reducer composition of claim 9, wherein the methyl ester of the $C_{12}$-$C_{36}$ carboxylic acid is selected from the group consisting of methyl laurate (methyl dodecanate), methyl tridecylicate (methyl tridecanate), methyl myristic (methyl tetradecanate), methyl pentadecylic (methyl pentadecanate), methyl palmitic (methyl hexadecanate), methyl margaric (methyl heptadecanate), methyl stearic (methyl octadecanate), methyl nonadecylic (methyl nonadecanate), methyl arachidic (methyl eicosanate), methyl heneicosylic (methyl heneicosanate), methyl behenic (methyl docosanate), methyl tricosylic (methyl tricosanate), methyl lignoceric (methyl tetracosanate), methyl pentacosylic (methyl pentacosanate), methyl cerotic (methyl hexacosanate), methyl heptacosylic (methyl heptacosanate), methyl montanic (methyl octacosanate), methyl nonacosylic (methyl nonacosanate), methyl melissic (methyl triacontanate), methyl henatriacontylic (methyl henatriacontanate), methyl laccerate (methyl dotriacontanate), methyl psyllic (methyl tritriacontanate), methyl geddic (methyl tetratriacontanate), methyl ceroplastic (methyl pentatriacontanate), methyl hexatriacontylate (methyl hexatriacontanate), methyl a-linolenate, methyl stearidonate, methyleicosapentaenate, methyl docosahexaenate, methyl linoleate, methyl linolenate, methyl dihomo-g-linolenate, methyl arachidonate, methyl adrenate, methyl palmitoleate, methyl vaccenate, methyl paullinate, methyl oleiate, methyl elaidate, methyl gondate, methyl erucate, methyl nervonate, methyl meadate, and mixtures thereof.

* * * * *